United States Patent [19]

Pugh et al.

[11] Patent Number: 5,131,024
[45] Date of Patent: Jul. 14, 1992

[54] METHOD AND APPARATUS FOR PROVIDING PROACTIVE CALL SERVICES FOLLOWING CALL COMPLETION

[75] Inventors: Joel A. Pugh, Dallas; Robert E. Nimon, Arlington, both of Tex.

[73] Assignee: Messager Partners, Dallas, Tex.

[21] Appl. No.: 524,633

[22] Filed: May 16, 1990

[51] Int. Cl.$^5$ .............................................. H04M 1/64
[52] U.S. Cl. ...................................... 379/67; 379/88; 379/204; 379/211
[58] Field of Search ............... 379/205, 204, 211, 212, 379/213, 214, 207, 201, 210, 97, 89, 84, 88, 67

[56] References Cited

U.S. PATENT DOCUMENTS

| | | | |
|---|---|---|---|
| 3,912,874 | 10/1975 | Botterell et al. | 379/280 |
| 4,577,062 | 3/1986 | Hilleary et al. | 379/88 |
| 4,893,335 | 1/1990 | Fuller et al. | 379/67 |
| 4,901,341 | 2/1990 | Carter et al. | 379/67 |
| 4,959,855 | 9/1990 | Daudelin | 379/213 |
| 5,036,533 | 7/1991 | Carter et al. | 379/230 |

Primary Examiner—Jin F. Ng
Assistant Examiner—Huyen D. Le

[57] ABSTRACT

The present invention describes an apparatus for use in a telephone network having a calling station connectable to a first switch means and a called station connectable to a second switch means, with the first and second switch means being connectable by a link. Generally, the apparatus comprises an interface having a passive in-line monitor connected in the link for detecting entry of a predetermined service access code by a user of the calling station or a user of the called station after call completion between the calling station and the called station and before either of said users goes on-hook. Upon entry of the predetermined service access code, a speech circuit of the apparatus issues a predetermined prompt to the user of the calling station and/or the user of the called station. Processor control circuitry of the apparatus is then responsive to entry of predetermined signaling by one of the users following the issuance of the prompt for providing a predetermined service controlled and paid for by the user requesting the predetermined service. Alternatively, if the parties are familiar with the service offering, the prompt is not required.

13 Claims, 2 Drawing Sheets

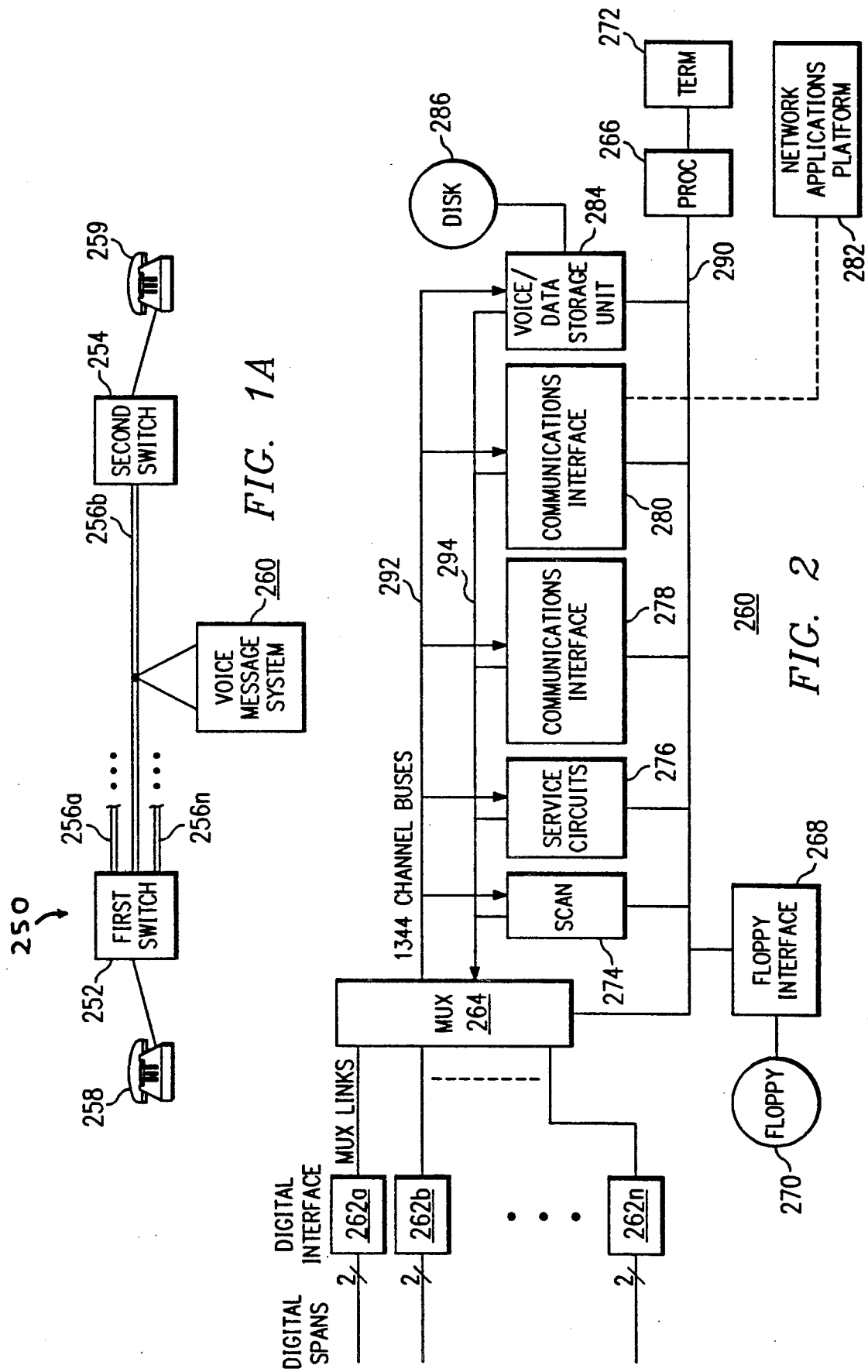

METHOD AND APPARATUS FOR PROVIDING PROACTIVE CALL SERVICES FOLLOWING CALL COMPLETION

TECHNICAL FIELD

The present invention relates to telephone systems and more particularly to a method and apparatus for providing a variety of caller-controlled proactive services after a caller has been connected to a called station.

BACKGROUND OF THE INVENTION

It is known in the prior art to carry telephone calls between local telephone operating companies through the AT&T network or through one or more independent inter-exchange carriers such as MCI or Sprint. The local telephone operating companies operate within a so-called local access and transport area (LATA). When a long distance call is dialed, the call is usually transmitted through an operating company central office to a point of termination in the originating LATA at which it is picked up by the inter-exchange carrier and passed by that carrier on to a termination point in a distant LATA. Upon reaching the destination LATA, the call is then transferred by the inter-exchange carrier to the local operating company central office within that LATA for ultimate connection to the original called station therein. Typically, the termination points of each LATA include suitable switching circuits, e.g., an access tandem, that are interconnected by a digital serial link. Such digital links are also presently used to interconnect virtually all central offices as well as to interconnect operating company switching networks to one or more cell site control switches of a mobile telephone network.

It is also known in the prior art to provide "automatic voice messaging" where, upon the occurrence of a busy/ring-no-answer condition at a called station, the user of the calling station can be connected to a voice message facility for recording a voice message for subsequent delivery to the called station. The decision to accept or reject the automatic voice messaging service is determined by the caller. Automatic voice messaging operates essentially after a call has been initiated but before the call can be completed to the called station.

It would be desirable to extend the advantages of caller-controlled automatic voice messaging to facilitate the providing of enhanced proactive services after call completion.

BRIEF SUMMARY OF THE INVENTION

It is an object of the invention to provide caller-controlled proactive telephone services to a caller after call completion.

It is another object to provide a unique system architecture that facilitates the offer/acceptance of various ancillary user services to the original caller at the calling station and/or the original called party at the called station after call completion between the calling station and called station.

It is a further object of the invention to describe an apparatus that passively monitors a line between calling and called stations following call completion, detects a request for an ancillary user service, and then controls the providing of such service at the request of either the calling party or the called party.

It is yet another object of the present invention to provide an apparatus having on-line monitoring capabilities for the selective offering and providing of various ancillary services under the control of, and at the cost to, one of the parties to the completed call.

These and other objects of the invention are achieved in a preferred embodiment of the invention describing an apparatus for use in a telephone network having a calling station connectable to a first switch means and a called station connectable to a second switch means, with the first and second switch means being connectable by a link. Generally, the apparatus comprises an interface having a passive in-line monitor connected in the link for detecting entry of a predetermined service access code by a user of the calling station or a user of the called station after call completion between the calling station and the called station and before either of said users goes on-hook. Upon entry of the predetermined service access code, a speech circuit of the apparatus issues a predetermined prompt to the user of the calling station and/or the user of the called station. Processor control circuitry of the apparatus is then responsive to entry of predetermined signaling by one of the users following the issuance of the prompt for providing a predetermined service controlled and paid for by the user requesting the predetermined service. Alternatively, if the user(s) are aware of the service offering, the speech circuit is not required in order to offer the service. In such alternative embodiments, the speech circuit can be used for a confirmation prompt.

BRIEF DESCRIPTION OF THE DRAWINGS

For a more completed understanding of the present invention and the advantages thereof, reference is now made to the following Description taken in conjunction with the accompanying Drawings in which:

FIGS. 1A, 1B and 1C are block diagrams of a digital telephone network in which a proactive call services system is preferably incorporated; and FIG. 2 is a detailed block diagram of the preferred embodiment of the proactive call services system of FIG. 1.

DETAILED DESCRIPTION

Figure 1B:
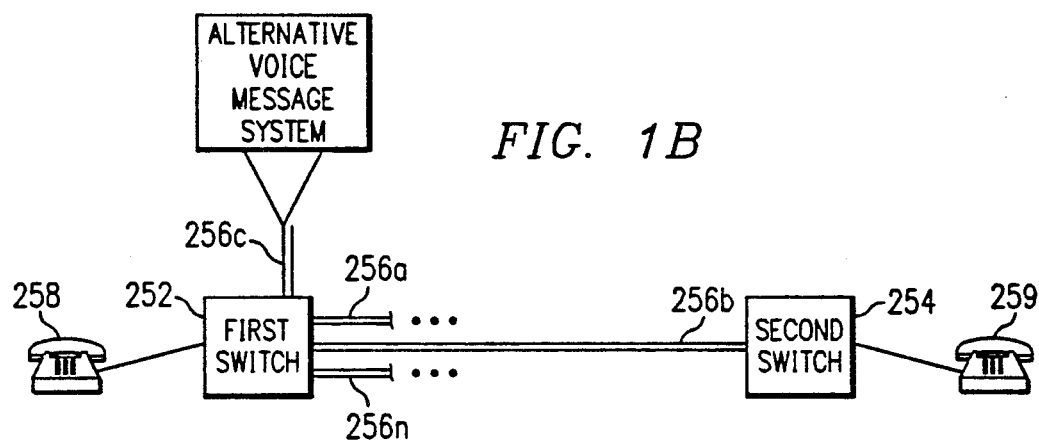

Referring now to FIG. 1A, a block diagram is shown of a generic digital telephone network 250 in which an automatic voice message system is advantageously provided according to the teachings of copending application Serial No. 07/478,674. The telephone network generally includes a first switch 252, a second switch 254, and a plurality of digital communications links interconnecting the first and second switches 252 and 254 and designated by the reference numerals 256a-n. At least one digital link 256 is preferably a high speed (1.544 MHz) T-1 span over which conventional in-band signaling is provided in a serial fashion; of course, other higher speed links as DS/3 can be used. Link 256, alternatively, is a high speed digital serial link over which digital signals are provided using out-of-band signaling with other communications protocols, such as X.25 or common channel signaling (SS7). The foregoing and other signals such as automatic number identification (ANI), destination number identification (DNI), billing information and Feature Group D information are generally referred to as call setup signals.

For purposes of generalization, FIG. 1A shows a calling station 258 connected (or connectable to via a central office or the like) to the first switch 252 and a called station 259 connected (or connectable) to the second switch 254. For the remainder of the discussion, it is assumed that a call to the called station 259 is initiated by a caller at the calling station 258. A proactive call services system 260 is placed across or in a digital link 256 for enabling the offering and acceptance of one or more predetermined call services under the control and at the expense of the caller at the calling station 258 or the caller at the called station.

Without limiting the foregoing, the first and second switches 252 and 254 are access tandems located at termination points between two LATAs. Alternatively, the first switch 252 is an access tandem and the second switch 254 is a cellular tandem or cell site controller for a mobile telephone system. In this configuration, the network 250 is a cellular telephone network. The first switch 252 may be an operating company central office while the second switch 254 is an access tandem. The first and second switches can interconnect two central offices. The system 260 is bridged across the link.

Referring briefly to FIG. 1B, in an alternate embodiment the system 260 is placed in a self-contained loop 256C from the first switch 252 (or the second switch 254 (not shown)). A "self-contained" loop means that the system 260 is located internally to the switch or as an adjunct thereto.

Referring now to FIG. 2, a detailed block diagram is shown of the preferred embodiment of a proactive call services 260 for use in a digital network environment. System 260 preferably includes an interface means including a plurality of interface circuits 262a–n each connected to a multiplexer 264. The multiplexer includes a control bus connected to a control means comprising a processor 266, storage interface 268, storage device 270 and input/output device 272. The processor is controlled in a conventional manner by suitable application programs stored in the storage device 270. Input/output device 272 is used to modify the system operation by entering suitable program commands to the control means.

The system 260 further includes a number of circuits for facilitating various monitor intercept, prompting, conferencing and redirect functions as will be described in more detail below. A scanner circuit 274 is provided to identify Feature Group D supervision or other similar information depending on the type of signaling used. A service circuit 276 includes a passive line monitor circuit as well as all necessary call progress (e.g., busy/ring-no-answer) detection circuits, speech generation circuits, and service acceptance (e.g., DTMF) detection circuits. The service circuit 276 also preferably includes appropriate circuitry for capturing ANI, DNI and billing information. A first communication interface 278 is provided to receive, interpret, format and transmit SS7 messages as will be described in more detail below. The system preferably also includes a second communication interface 280 connected to a network applications platform 282. The platform 282 includes a billing computer and other appropriate devices such as a database for transaction processing and accounting purposes. The system 260 advantageously includes its own voice/data storage unit 284 for storing voice messages; data or other call conversations as will be described. A storage. 286, preferably a disk storage, is connected to the voice/ data storage unit 284. The voice message or data storage may take place either in the voice/data storage unit or in the network applications platform, as is appropriate, to facilitate subsequent delivery.

Each of the circuits 274, 276, 278, 280 and 284 are connected to the processor 266 via the control bus 290. Input/output channel buses 292 and 294 also interconnect these circuits to the multiplexer of the interface means. Preferably, the interface means includes twenty-eight (28) T-1 interface circuits, each of which is connected to two digital links. Each T-1 interface circuit includes first and second T-1 interface circuits 295 and 297, with the first interface circuit 295 connected to one of the digital links and the second interface circuit 297 connected to the other digital link. The first and second digital links are thus connectable to bypass their respective interface circuit if the first and second T-1 interfaces are interconnected by means of the switch 298. Given this architecture, i.e., with 28 T-1 spans each carrying twenty-four (24) channels, the buses 292 and 294 service 1344 channels.

To provide automatic voice messaging, the scanner 274, service circuit 276 and/or communications interface 278 monitor the received signaling to determine the state of the call progress. Of course, the actual circuit used depends on the type of signaling. If an SS7 protocol is used, communications interface 278 monitors the line. If Feature Group D signaling is used, the Feature Group D information is collected in and processed by service circuit 276; other types of signaling are collected and processed by scanner 274. When call processing is required due to a busy or ring/no answer condition, the processor 266 activates the service circuits 276 to thereby issue a prompt offering (e.g., "Your party is not available; if you would like to leave a message, please press the # key") and monitor the line for acceptance of the service. Processor 266 also controls the circuit 276 to capture ANI, DNI and billing information. If the service is accepted, the service circuit 276 notifies the processor 266, which then controls the service circuit to issue appropriate prompts to the caller to instruct the caller to begin recording the message. The message is then recorded by the voice storage unit 284, and the processor controls the service circuit 276 to transfer the ANI, DNI, and billing information to the network applications platform 282. Although not meant to be limiting, preferably voice messages are stored in the voice/data storage unit 284 or its associated disk storage, while ANI, billing and other management information resides in the network applications platform.

For message delivery, the network applications platform ships the message routing information (i.e., the ANI, etc.) back to the voice/data storage unit 284, and the processor 266 then locates an open channel on a link for outdialing to the original called station. The service circuit then dials the call. When the call is placed, the scanner 274 watches the call states for answer supervision or on-hook/off-hook detection. If off-hook is detected, the service circuit 276 issues a prompt announcing the message which is then delivered by the voice storage unit 284. When the message is delivered, the processor 266 notifies the network applications platform and the packet is deleted.

If desired, the system 260 is connectable to a remote host computer via a dedicated communications interface which in turn is connected to the remote host via an RS-232 link or the like. This enables messages to be transferred to another location for the subsequent outdial attempts. As an alternate embodiment, the network applications platform 282 is set up to control billing and delivery attempts while the remote host issues the prompt announcing the message and other voice functions. The remote host can alternatively retain all billing information with the voice messager or other call information for a short time; and then passes off all such information to the platform 282 for further processing. It is also possible to have the voice/data storage unit 284 pass a "packet" (comprising the billing information) downstream to a platform 282, e.g., in a destination delivery area (a destination LATA).

The architecture of FIG. 2 is quite useful in providing various ancillary "instant" services to the calling station user and/or the called station user after the call between these parties has been completed. As used herein, "call completion" means the calling station has been successfully connected to the called station, i.e., a busy/ring-no-answer has not been encountered by the calling station user upon call initiation to the called station. According to the present invention, one or more such ancillary services are provided after call completion but before either party goes back to an on-hook condition.

One such ancillary service is conference calling. During the call, if either party determines that a conference is needed, that party can enter a predetermined access code (e.g., "2,2") which is detected by the passive on-line monitor circuit in the service circuit 276 of the system. Detection of the predetermined access code causes the processor 266 to control the service circuit to issue a prompt, e.g., "if you would like to add another party to this call, please dial that party's number now" or "if you would like to add a party to this call, please press # and follow the instructions" or the like. Depending on the prompt offering, one of the parties then enters the necessary signaling (dialed digits or the # sign, etc.) to accept the service offering. This signaling is detected by the service circuit 276 at which point the processor seizes an available line and places the call to the party sought to be conferenced. Such call initiation continues while the originally completed call remains in progress between the calling station and the called station. The system can either mute the ringing signals to the third party or allow such signals to be heard by the parties. Upon call completion to the third party, the processor 266 bridges the calls together to provide the conference. The database in the network applications platform 282 could then provide billing validity information as well as storing the billing information. Generally, the party who accepts the service is billed.

The system of FIG. 2 thus facilitates call conferencing in a proactive or caller-controlled manner which has heretofore never been available. From the caller's perspective, such ancillary services are provided to the call-in-process unobtrusively. If the parties are familiar with the service offering, a prompt offering may not be necessary following entry of the predetermined access code. In this embodiment, detection of the predetermined access code by the monitor circuit will result in the generation by the service circuit of a "beep" tone or superimposed dialtone (over the existing talkpath) instead of the prompt offering. One of the parties then dials the third party's telephone number or enters the appropriate code for acceptance of the service as the case may be. Confirmation of follow-up prompts may then be provided if necessary.

Yet another ancillary service available through the system of FIG. 2 is call recording. During the call, one or both of the parties may decide to record the call. Upon detection of a predetermined access code (e.g., a 2,7) by the on-line monitor of the service circuit 276, the circuit signals the processor 266. Processor 266 in turn connects the voice storage unit on line to immediately begin recording the call. Alternatively, the parties are provided the prompt offering to determine whether the continued conversations are to be recorded. The recording of the call, and the associated information packet containing the requesting party and billing information, is then transferred to the network applications platform 282 after the pathway to the platform is established as previously described. The party requesting the recording can then recall the recorded conversation from the platform 282 using dialup parameters such an entry and verification of security codes. Other collateral services, such as transcription of the recorded call, can thus be arranged and billed to the requesting party.

Another ancillary service is silent call recording. In this embodiment, a predetermined service access code is detected by the passive on-line monitor but not sent down the line to the party at the called station. The recording of the call is then carried out privately without the other party's knowledge. With this service, there is no need to provide a prompt offering, however, a one-way confirmation (to either the calling party or the called party) superimposed over a muted line (to the other party) is provided if desired. Although not meant to be limiting, the silent recording feature alternatively can be invoked by using a second band of an ISDN telephone, by transmitting out-of-band information, or by transmitting a combination of in-band and out-of-band signaling to a special "notch" filter.

Figure 1C:
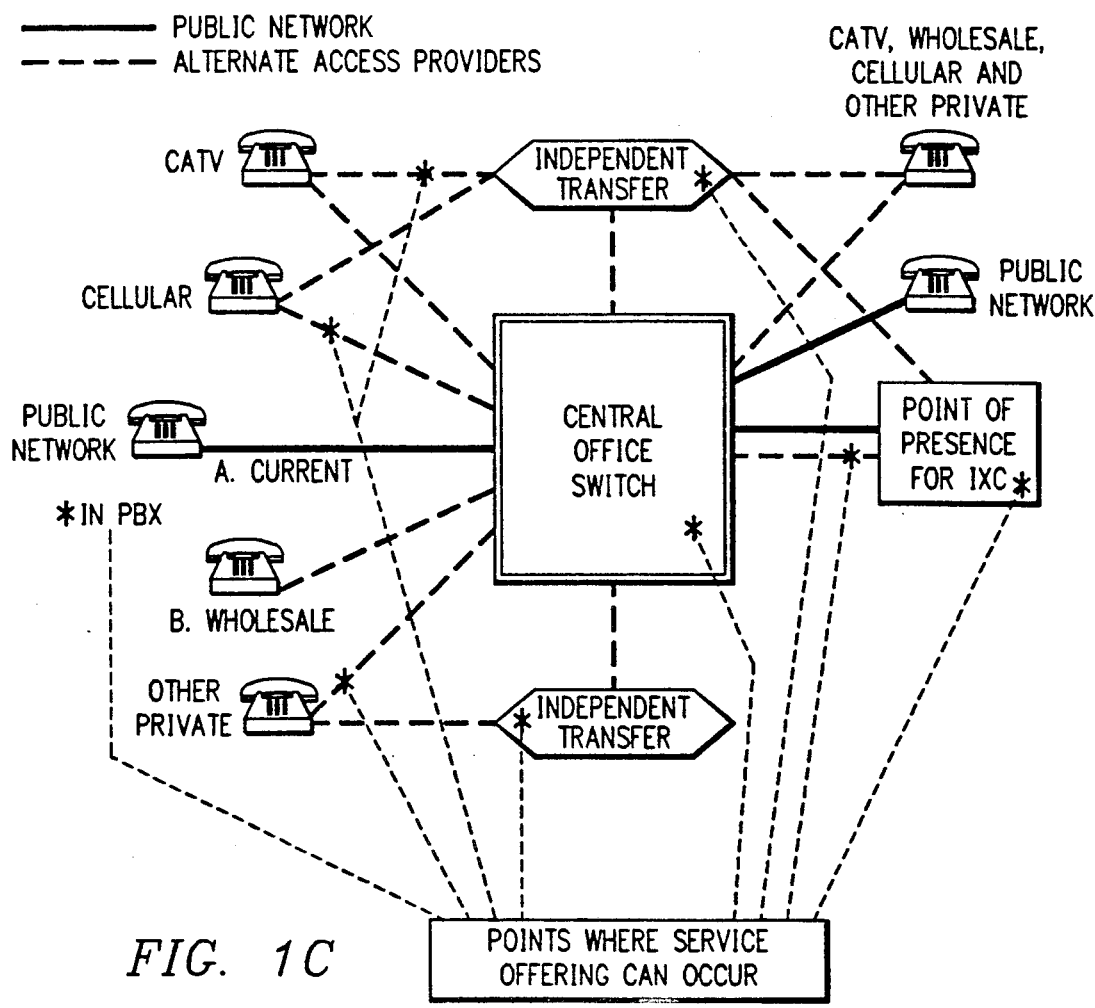

According to the present invention, either the calling party and/or the called party can invoke one or more of the above-identified services by entry of the appropriate code. Service may be offered at the destination either by subscription or as a basic service by the destination service provider. Generalizing, and with reference to FIG. 1C, conceptually the service offerings can be provided in numerous locations in and around the network. In particular, FIG. 1C shows a public telephone network with alternative pickup points, alternative central office switching points and alternate delivery processors. The system of FIG. 2 can be implemented at the various positions indicated in FIG. 1C.

Although not shown in detail, it should be appreciated that the architecture of FIG. 2 is quite powerful and enables the service provider to provide numerous ancillary call services that have heretofore been unavailable to users except in only limited ways behind a private branch exchange or the like and without the capability of providing such services in a proactive, caller-controlled and billed manner as described herein.

It should be appreciated by those skilled in the art that the specific embodiments disclosed above may be readily utilized as a basis for modifying or designed other structures for carrying out the same purposes of the present invention. It should also be realized by those skilled in the art that such equivalent constructions do not depart from the spirit and scope of the invention as set forth in the appended claims.

What is claimed is:

1. In a telephone network having a calling station connectable to a first switch means and a called station connectable to a second switch means, with the first and second switch means being connectable by a link, the improvement comprising:

means connectable in the link for storing call setup signals passing from said first switch means to said second switch means;

means connectable in the link for forwarding said call setup signals to said second switch means;

means connectable in the link to monitor for entry of a predetermined service access code by a user of the calling station r a user of the called station after call completion between the calling station and the called station and before either of said users goes on-hook; and control means connected to the monitor means and responsive to entry of the predetermined access code for controlling offer and acceptance of one or more predetermined services controlled and paid for by the user requesting the service.

2. In the telephone network as described in claim 1 wherein the service is call conferencing.

3. In the telephone network as described in claim 1 wherein the service is call recording.

4. In the telephone network as described in claim 1 wherein the service is silent call recording in which the recording of the call is carried out without alerting a user other than the user being offered and accepting the service.

5. Apparatus for use in a telephone network having a calling station connectable to a first switch means and a called station connectable to a second switch means, with the first and second switch means being connectable by a link, comprising:

means connectable in the link for storing call set up signals passing from said first switch means to said second switch means;

means connectable in the link for forwarding said call setup signals to said second switch means;

means connectable in the link to monitor for entry of a predetermined service access code by a user of the calling station or a user of the called station after call completion between the calling station and the called station and before either of said users goes on-hook; and speech means responsive to entry of the predetermined service access code for issuing a predetermined prompt to at least one of the user of the calling station and the user of the called station; and control means connected to the monitor means and responsive to entry of predetermined signaling by one of the users following the issuance of the prompt for providing a predetermined service controlled and paid for by the user requesting the predetermined service.

6. Apparatus for use in a telephone network having a calling station connectable to a first switch means and a called station connectable to a second switch means, with the first and second switch means being connectable by a link, comprising:

means connectable in the link for storing call setup signals passing from said first switch means to said second switch mean;

means connectable in the link for forwarding said call setup signals to said second switch means;

means connectable in the link to monitor for entry of a predetermined service access code by a user of the calling station or a user of the called station after call completion between the calling station and the called station and before either of said users goes on-hook; and control means connected to the monitoring means and responsive to entry of predetermined signaling by one of the users for providing a predetermined service controlled and paid for by the user requesting the predetermined service.

7. Apparatus for use in a telephone network having a calling station connectable to a first switch means and a called station connectable to a second switch means, with the first and second switch means being connectable by a link, comprising;

means in the first switch mean for storing call setup signals passing from said first switch means to said second switch means;

means in the first switch means for forwarding said call setup signals to said second switch means;

means in the first switch means to monitor for entry of a predetermined service access code by a user of the calling station or a user of the called station after call completion between the calling station and the called station and before either of said users goes on-hook; and control means connected to the monitor means and responsive to entry of predetermined signaling by one of the users for providing a predetermined service controlled and paid for by the user requesting the predetermined service.

8. Apparatus for providing telephone user ancillary call services, the apparatus connectable in a link between an origination switch and a destination switch, the switches connectable respectively to a calling and a called station, the apparatus comprising:

means for storing at least one call setup signal passing from said origination switch to said destination switch;

means for forwarding at least one call setup signal to said destination switch;

means for monitoring for user entry of a predetermined service access code from at least one of said stations to request at least one ancillary call service by monitoring for said code entry after call completion between said calling and said called stations and before either of said stations goes on hook and;

means responsive to entry of said predetermined service access code and said at least one call setup signal for providing said at least one ancillary call service.

9. The apparatus of claim 8 further comprising:

means for prompting a user of at least one of said stations to initiate said at least one ancillary call service.

10. The apparatus of claim 8 wherein said monitoring means monitors for said code entry during call setup.

11. Apparatus for providing telephone user ancillary call services, the apparatus connectable in a link between an origination switch and a destination switch, the switches connectable respectively to a calling and a called station, the apparatus comprising:

means for storing call setup signals passing from said origination switch to said destination switch;

means for forwarding said call setup signals to said destination switch;

means for monitoring answer supervision signals;

means for monitoring for user entry of a predetermined service access code from at least one of said stations to request at least one ancillary call service by monitoring for said code entry after call completion between said calling and said called stations and before either of said stations goes on hook and;

means responsive to entry of said predetermined service access code and at least one of said call setup signals and said answer supervision signals for providing said at least one ancillary call service, said service being paid for by said requesting user.

12. Apparatus for use in a telephone network having a calling station connectable to a first switch means and a called station connectable to a second switch means, with the first and second switch means being connectable by at least one link, comprising:

storage means connectable in said at least one link for storing call setup signals passing from said first switch means to said second switch means;

monitor means connectable in said at least one link for monitoring for entry of a predetermined service access code after call completion between said calling and said called stations and before either of said stations goes o hook and;

means connectable in said at least one link responsive to said call setup signals and said predetermined service access code for forwarding said call setup signals on an alternative one of said at least one link to said second switch.

13. The apparatus of claim 12 further comprising:

means for prompting a user of at least one of said stations to enter a predetermined service access code.

* * * * *

UNITED STATES PATENT AND TRADEMARK OFFICE
CERTIFICATE OF CORRECTION

PATENT NO. : 5,131,024

DATED : July 14, 1992

INVENTOR(S) : Joel A. Pugh and Robert E. Nimon

It is certified that error appears in the above-identified patent and that said Letters Patent is hereby corrected as shown below:

Column 7, line 8, change "r" to -- or --.

Column 7, line 60, change "mean" to -- means --.

Column 8, line 11, change "mean" to -- means --.

Column 10, line 5, change "o" to -- on --.

Signed and Sealed this

Nineteenth Day of October, 1993

*Attest:*

BRUCE LEHMAN

*Attesting Officer*        *Commissioner of Patents and Trademarks*